Dec. 28, 1965  D. A. ANDERSON  3,225,947
DUMP HOPPER
Filed Nov. 29, 1963  3 Sheets-Sheet 1
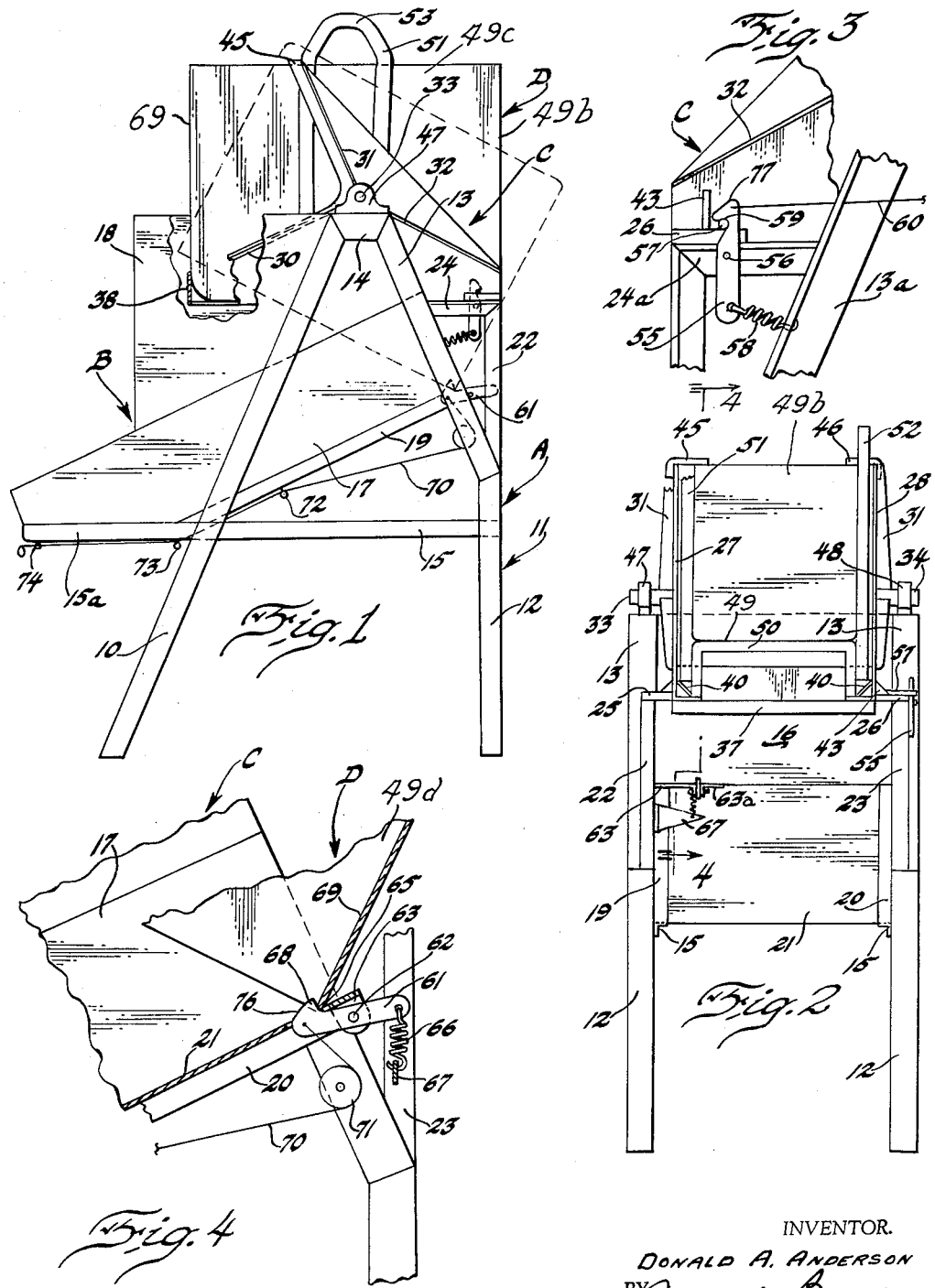
INVENTOR.
DONALD A. ANDERSON
BY Carl J. Barbee
ATTORNEY Dec. 28, 1965  D. A. ANDERSON  3,225,947
DUMP HOPPER
Filed Nov. 29, 1963  3 Sheets-Sheet 2
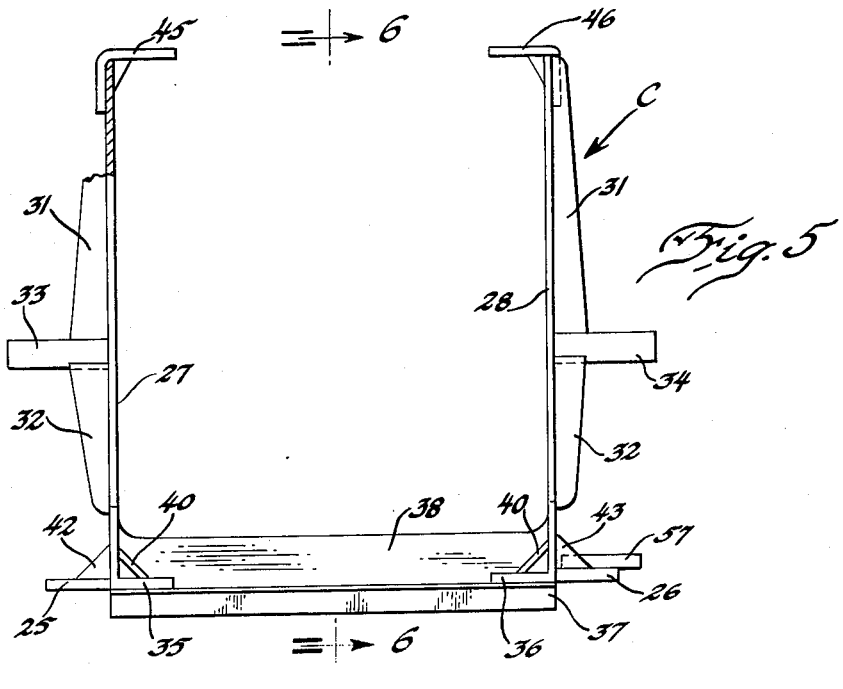
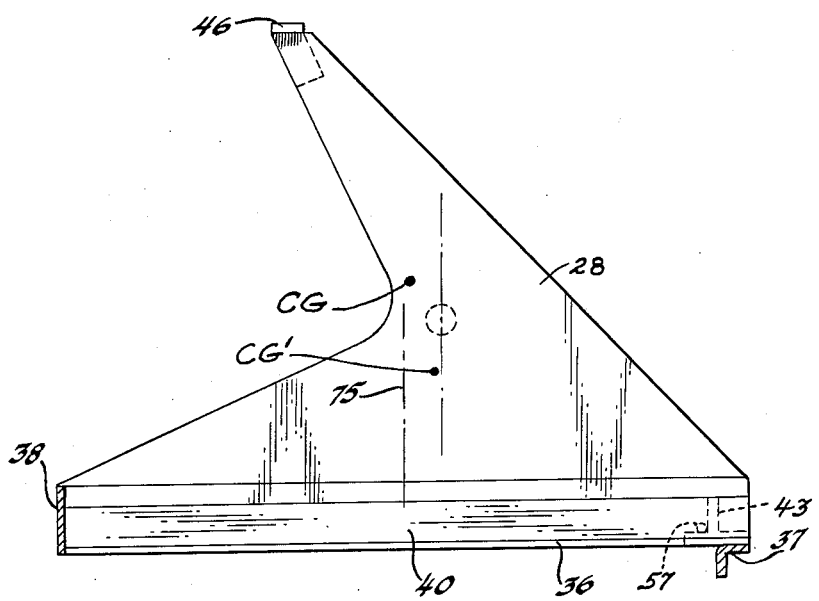
INVENTOR.
DONALD A. ANDERSON
BY
Carl J. Barbee
ATTORNEY

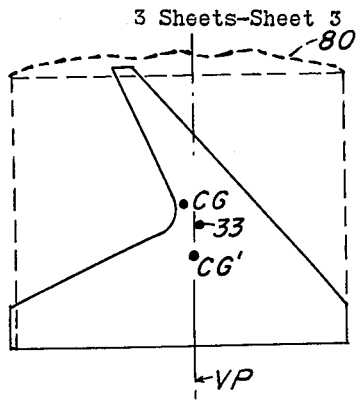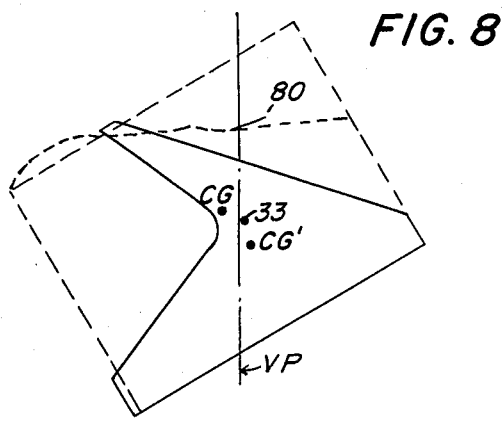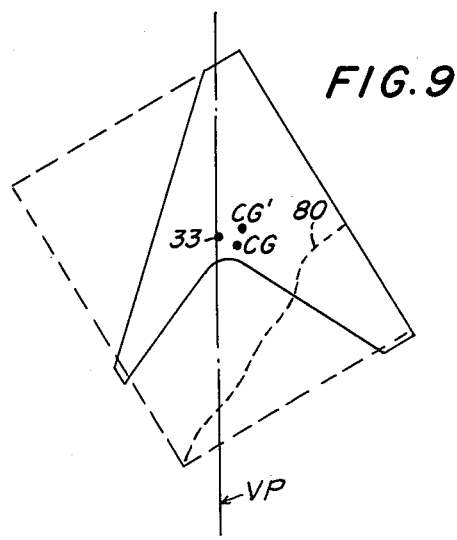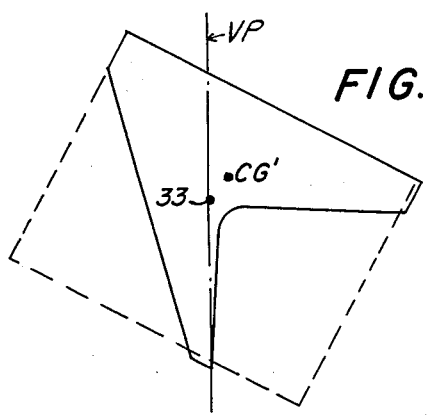
INVENTOR
DONALD A. ANDERSON
BY Carl J. Barbee
ATTORNEY

United States Patent Office 3,225,947
Patented Dec. 28, 1965

3,225,947
DUMP HOPPER
Donald A. Anderson, Racine, Wis., assignor to American Motors Corporation, Kenosha, Wis., a corporation of Maryland
Filed Nov. 29, 1963, Ser. No. 326,719
8 Claims. (Cl. 214—302)

The invention relates to a dump hopper and has as its principal object a hopper with a dumping saddle which is self-actuated in accordance with the load condition of the removable container carried by the saddle.

A specific object is to provide in a dump hopper, a container carrying saddle with novel latching means actuated automatically to restrain the saddle in loading and unloading positions as desired.

A further specific object is to provide in a dump hopper, a saddle with side walls constructed to effect a weight distribution with respect to its supporting pivots whereby to induce automatic return to loading position after unloading has been accomplished.

A further specific object is to provide a dump hopper with a saddle and container assembly in which the center of gravity of the loaded container and saddle while in loading position is shifted when the empty container and saddle is situated in unloading position, thereby facilitating the automatic return of the saddle and container to loading position under the influence of gravity and momentum.

A further specific object is to provide in a dump hopper, a saddle and removable container assembly in which the container includes a rigid side wall enclosure and the saddle and container assembly is rotatable relative to a supporting frame throughout an arc in excess of 120 degrees in order to effectuate complete unloading of the container of its load.

A further specific object is to provide in a dump hopper, a saddle and container assembly rotatable relative to a supporting frame from loading to unloading position and wherein the center of gravity of such assembly shifts to the opposite side of a vertical plane drawn through the pivots of rotation of such assembly when it is rotated from loading to unloading position.

Other objects and advantages of the invention will be apparent from the ensuing specification and appended drawings in which:

FIGURE 1 is a side elevation of the dump hopper shown partly in section.

FIGURE 2 is a rear-end view of the dump hopper of FIGURE 1.

FIGURE 3 is a fragmentary detail view of the opposite side of the dump hopper as shown in FIGURE 1.

FIGURE 4 is a fragmentary sectional view taken on the line 4—4 of FIGURE 2 with the container in unloading position.

FIGURE 5 is a detail end view of the saddle.

FIGURE 6 is a sectional view taken on the line 6—6 of FIGURE 5.

FIGURES 7, 8, 9 and 10 are intended as diagrammatic showings of various positions of the container and saddle assembly during rotation from loading to unloading positions.

In general, the dump hopper includes a supporting frame A which carries a material handling hopper B. A saddle C is pivotally mounted at the upper end of the frame for receiving a removable container D.

The frame may be comprised of a generally A-shaped structure including an inclined forward leg 10 and a rearward leg 11 having a vertical floor engaging portion 12 and an upper inclined portion 13. At the apex of the structure a horizontally disposed web piece 14, which is anchored to legs 10 and 13, serves as a support for the saddle C. A corresponding A-shaped structure is formed at the opposite side of the hopper B and the two structures are anchored to the opposite side walls of the hopper. Crossties 15 are anchored between the forward and rearward legs of each A-frame and project beyond the forward legs with the portions 15a which carry the forward portion of the hopper B.

The hopper may consist of the inclined spaced side walls 17 and the upwardly extending continuations 18 of such side walls. A front wall 16 (see FIGURE 2) interconnects the continuation walls 18. Spaced angle irons 19 and 20 are anchored at their opposite ends to the forward and rearward legs of the A-frame and carry the floor portion 21 of the hopper. The side walls 17–18 of the hopper are open at their rearward ends to accommodate the swinging of the container D. The rear legs 12 of the A-frame are provided with upwardly extending continuations 22 and 23 and inwardly extending ledges 24 and 24a which serve as shoulders against which the saddle stops 25 and 26 abut.

The saddle C may be fabricated of side wall panels 27 and 28 spaced apart sufficiently to accommodate the width of the removable container D. Strengthening ribs 30, 31 and 32 lend rigidity to the side walls and terminate short of each other at their inner ends to accommodate the trunnions 33 and 34 which are welded to the saddle side walls and to the inner ends of the strengthening ribs. The saddle side walls have inwardly directed flanges 35 and 36 which extend lengthwise thereof and a crossbrace 37 is anchored at its opposite ends to such flanges. At the forward end of the saddle, an upwardly projecting wall 38 is anchored at its opposite ends to the side walls and serves as a crossbrace as well as a stop against which the forward wall of the removable container abuts.

Inclined plates 40 are welded to the flanges and extend throughout the length of the saddle side walls. The plates serve as strengthening members as well as locating and guiding surfaces when the removable container is being inserted into the saddle.

The outwardly projecting stops 25 and 26 are anchored to the side walls of the saddle, as by means of welding, and triangular-shaped reinforcing plates 42 and 43 are welded to the side walls and to the stops.

A pair of angle brackets are anchored at the upper-most ends of the saddle side walls and have inwardly turned flanges 45 and 46 which overhang the upper edges of the side walls of the removable container. A pair of bearing blocks 47 and 48 are anchored, one to each web piece 14, at the upper-most ends of the opposite A-frame members to pivotally mount the saddle trunnions 33 and 34.

The removable container may be in the form of rectangular-shaped box, including a front wall 69, rear wall 49b and spaced side walls 49c and 49d collectively surrounding the floor 49 at its perimeter and is open at its upper end, the perimeter of such opening lying in a substantially horizontal plane when the container is in loading position as shown in FIGURE 1. The floor portion 49 of the container is mounted on an inverted U-shaped frame member 50 providing an open area beneath the box for receiving the tines of an industrial-lift truck. Hairpin-shaped handles 51 and 52 may be welded to the side walls of the container and provide lifting loops 53 as well as permitting stacking of successive containers one on top of the other. The container is inserted into the saddle from the rearward end by means of the lift truck. The container is initially lifted to the proper height (as shown in FIGURE 1) and is then moved in a horizontal path until the forward end of the container engages the saddle wall 38, then the tines of the lift truck are withdrawn.

Viewing FIGURE 3, there is shown a latch 55 which is mounted on a pivot pin 56 which is anchored to the frame member 24a. A latch bolt 57 may be welded to the upper surface of stop 26 and a tension spring 58 normally urges the latch into the locked position as shown in FIGURE 3 wherein the latch notch 59 overhangs the latching bolt 57. Thus, the saddle is locked in loading position relative to the frame as shown in FIGURES 1 and 3. A cable 60 may be fastened to the upper end of the latch for effecting unlatching when desired.

A second latch 61, shown best in detail in FIGURE 4, is pivotally mounted on pivot pin 62 which is anchored to suitable brackets 63 and 63a which in turn are anchored to an extension 65 of the hopper floor 21. A tension spring 66 has one end anchored to the latch and the other end anchored to a bracket 67 which is secured to the angle iron 22. When the container is in unloading position as shown in dotted lines in FIGURE 1 and as shown in FIGure 4, the latch 61 is engaged with the wall 69 of the container. A cable 70 is fastened at one end to the latch 61 and is trained about a pulley 71 and passes through suitable intermediate guide members 72, 73 and 74 for access to the operator who is using the material in the hopper.

Viewing FIGURE 6, it will be noted that the trunnions 33 and 34 are mounted on the saddle walls rearwardly of the vertical center line 75 and when the container D is in loading position within the saddle and is filled with material, then an excess weight is situated forwardly of the pivots 33 and 34. For example, the container may be filled with steel forgings weighing in the neighborhood of 1000 pounds and more than 500 pounds would be situated forwardly of the pivots 33 and 34. Under conditions in which the container is loaded and the container and saddle assembly is in the loading position as shown in FIGURE 1, the center of gravity may be situated approximately as indicated at CG in FIGURE 6. However, with the container empty and the container and saddle assembly in loading position, the center of gravity will become shifted to the approximate position as indicated as CG' in FIGURE 6.

When the operator wishes to fill the hopper, he can pull on the cable 60 unlatching the latch 55 from the latching bolt 57. The excess weight forwardly of pivots 33 and 34 automatically causes the saddle and the container to swing forwardly and to commence to unload the forgings into the hopper. Momentum will cause the saddle and container to continue swinging forwardly until the container wall 69 engages the cam surface 76 on latch 61. When the edge of the container wall travels beyond the cam surface, then the spring 66 will cause the latch to lock the container in the unloading position as shown in dotted lines in FIGURE 1. With the center of gravity at a higher level (because of the container being loaded), additional momentum is achieved while the container and saddle is swinging toward unloading position.

With the container and saddle assembly in unloading position (as shown in dotted lines in FIGURE 1) and the container empty, excess weight is situated slightly rearwardly of the pivots 33 and 34 and the center of gravity has shifted so as to again be at a higher level (CG' being above the level of CG when the container and saddle are in unloading position). Thus, when the operator pulls on cable 70 releasing the latch 61, then the saddle and container will automatically swing forwardly toward loading position as shown in solid lines in FIGURE 1. Additional momentum will be obtained because of the higher level of the center of gravity and will cause the saddle and container to continue swinging toward loading position until the pin 57 engages the cam surface 77 on latch 55, automatically effecting the locking condition as shown in FIGURE 3. The ledges 24 and 24a serve as shoulders against which the saddle stops 25 and 26 abut to limit the swinging movement of the container and saddle in the direction toward loading position (clockwise when viewing FIGURE 1).

Thus, the loading and unloading of the dump hopper is automatically achieved in both loading and unloading directions assisted by the additional energizing obtained because of the shifting of the center of gravity.

The extent of swinging movement of the saddle and container assembly is limited to an arc of less than 180° but greater than 120° (as indicated in FIGURE 1). Thus, the saddle wall 38 and the saddle flanges 45 and 46 (being forwardly of the vertical center line 75 and being adjacent the carrying loops 53) serve to restrain any tendency of the container from becoming dislodged from the saddle during rotation of saddle and container from loading to unloading position.

Referring to FIGURES 7, 8, 9 and 10, I have shown various positions of the container and saddle assembly during rotation from loading position (FIGURE 7) to fully unloaded position (FIGURE 10). VP is intended as an edge viewing of a vertical plane drawn through the axes of the saddle pivots 33 and 34.

Assuming that the container is empty and that the saddle and container assembly is in loading position, as shown in FIGURE 7, the center of gravity CG' of the assembly will be situated forwardly of the vertical plane VP so that there is some excess weight forwardly of the pivots 33 and 34. If latch 55 is then released, the saddle and container assembly will commence rotating automatically in a counter-clockwise direction viewing FIGURE 7. It would eventually settle in a static balance condition with CG' located in the plane VP.

FIGURE 8 indicates a position in which CG' has gone beyond the plane VP so as to be rearwardly thereof.

With the container loaded with a load, which is indicated by the numeral 80, the center of gravity CG is situated further forwardly of VP and at a higher level so as to remain on the forward side of VP throughout a substantial portion of the rotating movement of the saddle and container assembly, until approximately the position shown in FIGURE 9 is reached. However, since a major portion of the load 80 will have been dumped into the hopper at the position shown in FIGURE 9, CG will have changed and will be situated somewhere rearwardly of VP. As the load is progressively dumped into the hopper, the position of CG, of course, continuously changes.

Momentum, of course, is necessary to cause the saddle and container assembly to swing throughout its full arc until it reaches fully unloaded position as shown in FIGURE 10 (when latch 61 automatically comes into operation to hold the container and saddle assembly in fully unloaded position).

As has been previously mentioned, the full arc of travel from the loading position of FIGURE 7 to the fully unloaded position of FIGURE 10 is in excess of 120° but less than 180°. This makes it possible to unload a container having fixed side walls and one which is open only at the top.

With the container and saddle assembly in fully unloaded position, as shown in FIGURE 10, the center of gravity is rearwardly of VP and above the level of pivots 33 and 34 thereby assuring a substantial extent of arcuate travel before CG' reaches the static balance point (in the plane VP), thereby assuring sufficient build up of momentum to cause the saddle and container assembly to continue swinging automatically (in a clockwise direction viewing FIGURE 10) until the re-load position (of FIGURE 7) is reached. Then latch 55 automatically comes into operation for holding the saddle and container assembly in the FIGURE 7 position for reloading of the container.

I claim:

1. A dump hopper and container assembly comprising spaced frame members; a hopper positioned between the frame members and carried thereby; a saddle carried by the frame members above the hopper, said saddle including spaced side walls and a trunnion projecting outwardly from each side wall; a bearing on each frame member, each having a trunnion rotatably received therein, whereby the saddle is mounted for swinging movement about the axes of the tunnions; a container removably carried by the saddle between the side walls thereof; said trunnions being located eccentrically relative to a vertical plane passing through the longitudinal center of the container and through the longitudinal centers of the saddle side walls, whereby gravity and momentum causes the saddle and container, when loaded, to rotate counterclockwise about the axis of the trunnions throughout an arc in excess of 120 degrees and gravity and momentum causes the container, when empty, and saddle to rotate throughout the same arc in excess of 120 degrees clockwise; the center of gravity of the saddle and container at one end of the arc being situated forwardly of a vertical plane drawn through the axes of the trunnions and the center of gravity of the saddle and container at the opposite end of the arc being situated rearwardly of the vertical plane drawn through the axes of the trunnions and also above the level of such trunnion axes.

2. A dump hopper and container assembly comprising spaced frame members; a hopper positioned between the frame members and carried thereby; a saddle carried by the frame members above the hopper; said saddle including spaced side walls pivotally connected one to each frame member and the axes of such pivotal connections defining a substantially horizontal rotation axis, whereby the saddle is rotatable in excess of 120° from loading position to unloading position relative to the frame members; a container removably carried by the saddle between the side walls thereof; said container having a floor and a front wall, a rear wall and spaced side walls collectively surrounding the floor and connected thereto, said container being open at its upper end and said open upper end being directed substantially vertically upwardly when the saddle and container are in loading position; that portion of the saddle and container forwardly of the pivotal connections, when the container is loaded and in loading position being heavier than that portion of the saddle and container rearwardly of the pivotal connections and the center of gravity of the loaded container and saddle, when in loading position, being situated forwardly of a vertical plane drawn through the axes of the pivotal connections; and the saddle and container when unloaded and when in unloading position being so weighted relative to the pivotal connections to accentuate momentum during rotation by gravity of the saddle and container in loading direction; the center of gravity of the unloaded container and saddle when in unloading position being situated rearwardly of the aforesaid vertical plane.

3. A dump hopper and container assembly as set forth in claim 2 wherein means are carried on the saddle and frame for releasably restraining the saddle and container in loading position.

4. A dump hopper and container assembly as set forth in claim 3 wherein the releasable restraining means are automatically actuated during rotation of the container and saddle from unloading position to loading position.

5. A dump hopper and container assembly as set forth in claim 4 wherein means are carried on the frame for releasably restraining the container and saddle in unloading position.

6. A dump hopper and container assembly as set forth in claim 5 wherein the means for releasably restraining the container and saddle in unloading position are automatically actuated during rotation of the container and saddle from loading position to unloading position.

7. A dump hopper and container assembly comprising spaced frame members; a hopper positioned between the frame members and carried thereby; a saddle carried by the frame members above the hopper; said saddle including spaced side walls pivotally connected one to each frame member, whereby the saddle is rotatable from loading position to unloading position about a substantial horizontal axis relative to the frame members; a container removably carried by the saddle between the side walls thereof; that portion of the saddle forwardly of the pivotal connections being heavier than that portion of the saddle rearwardly of the pivotal connections and that portion of the saddle beneath the level of pivotal connections being heavier than that portion of the saddle above the level of the pivotal connections when the saddle is in loading position; said pivotal connections being located eccentrically relative to a vertical plane passing through the longitudinal center of the container and through the longitudinal centers of the saddle side walls; said container and saddle assembly, when in loading position and when the container is loaded, having a center of gravity situated forwardly of a vertical plane drawn through the axes of the pivotal connections and being situated a pre-determined distance from the pivotal connections and said container and saddle assembly, when in unloading position and when the container is unloaded, having a center of gravity situated a greater distance from the pivotal connections; a latch carried on the frame and engageable with the saddle for restraining the saddle and container assembly in loading position; means for releasing the latch whereby rotation of the saddle and container assembly toward unloading position is automatically effected under the influence of gravity.

8. A dump hopper and container assembly as set forth in claim 2 wherein the center of gravity of the unloaded container and saddle when in unloading position is also situated above the level of the axes of the pivotal connections.

References Cited by the Examiner

UNITED STATES PATENTS

| | | | |
|---|---|---|---|
| 752,187 | 2/1904 | Smith | 214—317 |
| 772,041 | 10/1904 | Hoover et al. | 298—13 X |
| 1,170,240 | 2/1916 | Gary | 298—17 |
| 1,786,560 | 12/1930 | Burrows et al. | 298—13 |

LOUIS J. DEMBO, *Primary Examiner.*

RAPHAEL M. LUPO, *Examiner.*

N. L. STACK, *Assistant Examiner.*

UNITED STATES PATENT OFFICE
CERTIFICATE OF CORRECTION

Patent No. 3,225,947    December 28, 1965

Donald A. Anderson

It is hereby certified that error appears in the above numbered patent requiring correction and that the said Letters Patent should read as corrected below.

Column 2, line 53, after "of" insert -- a --; line 62, for "industrial-lift" read -- industrial-type lift --; column 6, line 16, for "substantial" read -- substantially --; line 22, after "of", second occurrence, insert -- the --.

Signed and sealed this 13th day of December 1966.

(SEAL)

Attest:

ERNEST W. SWIDER
Attesting Officer

EDWARD J. BRENNER
Commissioner of Patents